Oct. 17, 1967  S. F. HARRIS  3,347,085
THERMAL BALANCING APPARATUS FOR ADJUSTING
AND TESTING THERMOSTAT DEVICES
Filed Dec. 30, 1965  2 Sheets-Sheet 1
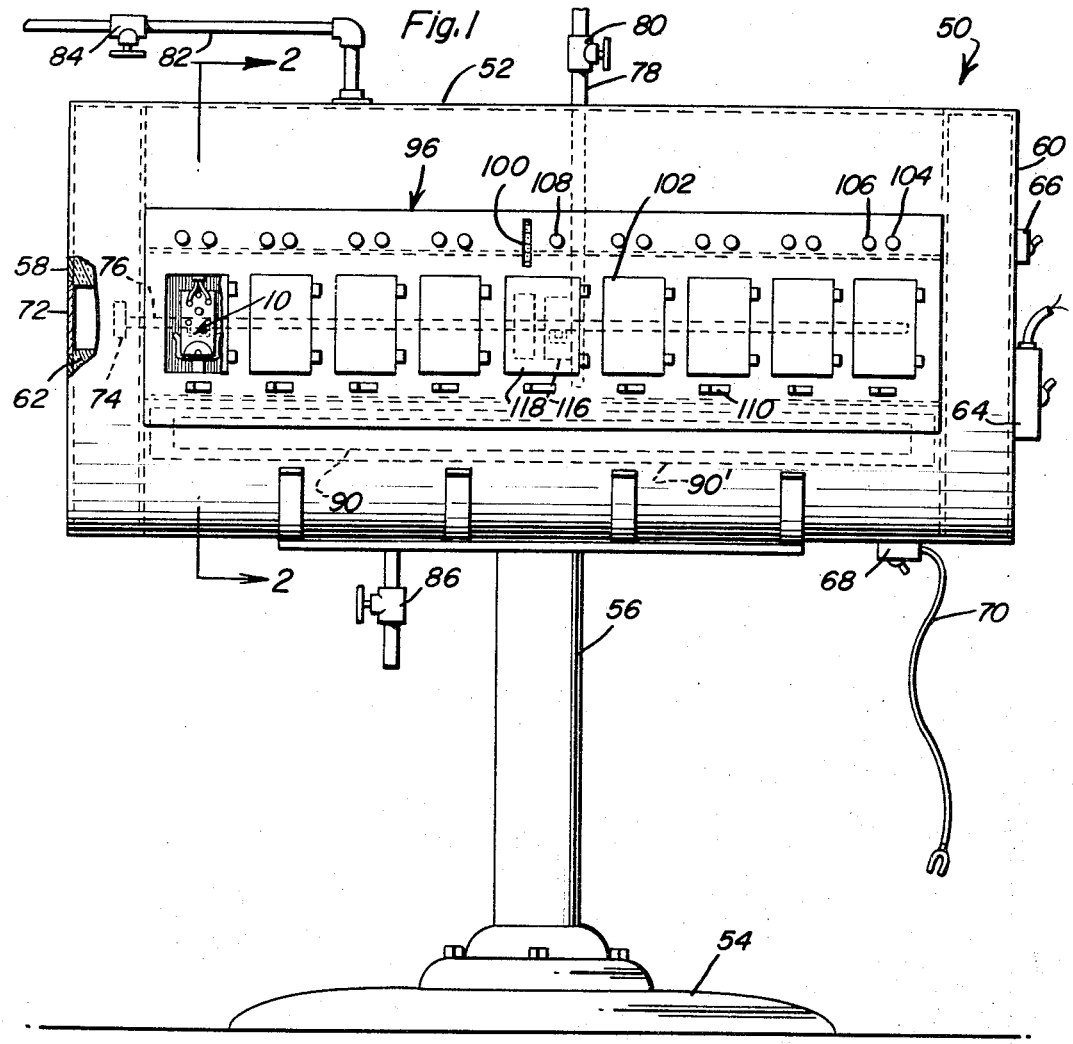
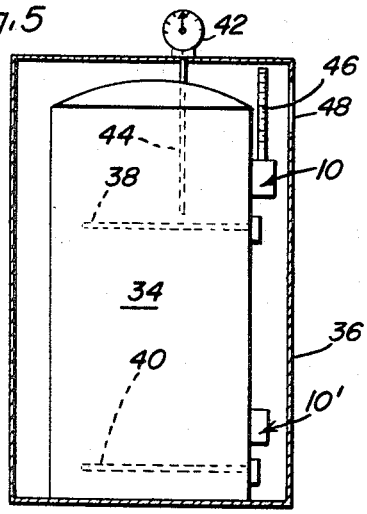
Sidney F. Harris
INVENTOR.
BY *Clarence A. O'Brien*
and *Harvey B. Jacobson*
Attorneys

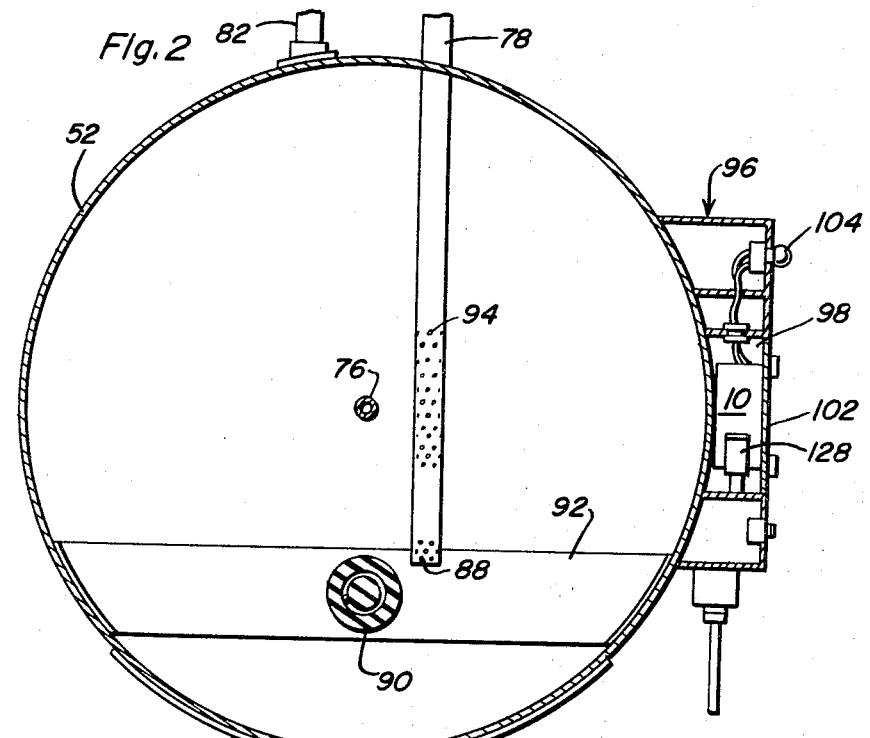

United States Patent Office 3,347,085
Patented Oct. 17, 1967

3,347,085
THERMAL BALANCING APPARATUS FOR ADJUSTING AND TESTING THERMOSTAT DEVICES
Sidney F. Harris, 1371 N. Christina St., Sarnia, Ontario, Canada
Filed Dec. 30, 1965, Ser. No. 517,620
10 Claims. (Cl. 73—1)

This invention relates to the adjustment and testing of thermostat devices particularly those thermostat devices associated with electrical water heaters.

Thermostat devices for water heaters or the like are usually calibrated by the manufacturers to meet certain standards which cannot accommodate different individual requirements of the water heaters because of the wide variation in calibration involved. As a result thereof, water heaters are operated under somewhat less than maximum economy for any desired setting of the thermostat devices. It is therefore a primary object of the present invention to provide apparatus for efficiently, rapidly and economically adjusting thermostat devices so that they may meet individual control requirements of electric water heaters and other similar equipment.

An additional object of the present invention is to provide apparatus for the balancing of thermostat devices in accordance with certain requirements and testing of such thermostat devices once they are balanced in order to effect a highly accurate adjustment of the thermostat devices.

A further object of the present invention is to provide apparatus through which a plurality of thermostat devices may be adjusted and tested by removable mounting of the thermostat devices within insulated receptacles on a tank containing a body of water internally heated to a predetermined temperature in order to simulate conditions under which the thermostat devices are designed to operate. Facilities for controlling the temperature of the body of water and measuring the temperature differential between the water and the tank is therefore provided as well as indicator lamps signifying the condition of the thermostat devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the apparatus of the present invention.

FIGURE 2 is a transverse sectional view taken substantially through a plane indicated by section line 2—2 in FIGURE 1.

FIGURE 3 is an electrical circuit diagram showing the circuitry associated with the apparatus of the present invention.

FIGURE 4 is a front elevational view of a typical thermostat device adapted to be adjusted or tested on the apparatus of the present invention.

FIGURE 5 is a simplified side sectional view of a typical installation for which the thermostat devices are to be adjusted.

Referring now to the drawings in detail, it will be observed from FIGURE 4 that a typical thermostat device generally denoted by reference numeral 10 is provided with four electrical terminals 12, 14, 16 and 18 through which the thermostat device is connected within a thermal control circuit. The input terminals 12 and 14 are interconnected internally of the device by a fuse 20 through which electrical energy is conducted from a voltage source. Depending upon the condition of the thermostat device, current is conducted to either of the output terminals 16 and 18. The thermal condition at which the thermostat device transfers electrical energy from terminal 16 to terminal 18, is determined by the position of the dial pointer 22 on a precalibrated dial face 24 which is provided with a limit stop 26. Also mounted on the front panel of the thermostat device as shown in FIGURE 4 is an adjustment screw 28 enclosed by a protective cap 30. Upon removal of the cap 30, the adjustment screw 28 may be rotated by use of a screwdriver in order to vary the thermal responsive characteristics of the thermostat device. A contact spacing adjustment screw 32 is also provided and may be protectively enclosed by another cap (not shown).

Although the calibration of the scale on the dial face 24 of the thermostat device 10 may represent some approximation or compromise which is acceptable in most cases, it is the purpose of the present invention to more accurately adjust the thermostat device for its particular installation such as shown for example in FIGURE 5. As shown in FIGURE 5, a water tank 34 is enclosed within an insulated casing 36 and contains a body of water heated by an upper electrical heating element 38 and a lower electrical heating element 40. Energization of the heating elements 38 and 40 are respectively controlled by an upper thermostat device such as the thermostat device 10 and a lower thermostat device 10' similar thereto. The pointers 22 of these thermostat devices are usually set at a temperautre value on the dial face 24 corresponding to the internal temperature of the water within the tank. It will however be appreciated, that the temperature of the water internally of the tank will be somewhat different from the temperature of the water adjacent the wall of the tank on which the thermostat device is mounted. For example, there may be a 20 degree F. temperature difference between the water as measured on the temperature reading device 42 associated with the heat probe 44 and the temperature of the thermostat 10 itself as indicated by the thermometer 46 viewed through the window 48, when the water within the tank is brought to a temperature of 150 degrees F. The lower thermostat device 10' on the other hand may be at a temperature which is approximately 10 degrees less than the temperature of the water within the tank in view of different heat transfer conditions thereat. Thus, the apparatus of the present invention is useful for adjusting thermostat devices 10 and 10' in accordance with their installational requirements in order to more accurately obtain a desired temperature for the body of water within the tank of the water heater.

Referring now to FIGURES 1 and 2, it will be observed that the thermostat adjusting and testing apparatus generally denoted by reference numeral 50 includes a horizontally extending, water-containing tank 52 supported above a base 54 by a vertical standard 56 on which it is mounted. The axial ends of the tank are spaced from end walls 58 and 60. Insulation 62 is provided between the axial ends of the tank and the end walls. Mounted on the end wall 60 is a mode control switch 64 and an indicator operating switch 66. Also mounted on the bottom of the tank is a test switch device 68 from which a test lead 70 extends. The end wall 58 on the other hand is provided with a window 72 through which a temperature indicator 74 may be viewed, the temperature indicator being connected to one end of a heat probe 76 that extends centrally through the body of water contained within the tank 52.

Cold water is supplied to the tank through an inlet conduit 78 upon opening of an inlet valve 80. Heated water on the other hand, is withdrawn from the tank through the outlet conduit 82 upon opening of the outlet valve 84. A drain valve 86 is also connected to the bottom of the tank through which the water within the tank may be drained. The inlet conduit therefore projects into the tank and is provided with a plurality of outlet ports or perforations 88 at a lower end thereof adjacent to a pair of electrical heating elements 90 and 90' mounted by a band 92 internally of the tank. Vertically spaced above the outlet ports 88, are a second group of outlet ports 94 horizontally aligned between the heat probe 76 and an insulated housing assembly 96 within which a plurality of thermostat devices 10 may be removably received for adjusting or testing purposes. Thus, cold water may be supplied to the tank when desired in such a manner as to promptly lower the temperature of the water between the heat probe 76 and the thermostat devices 10 which respond to variations in the water temperature produced by supply of cold water and energization of the heating elements.

The housing assembly 96 includes a plurality of insulated receptacle chambers 98 within which the thermostat devices are received, eight of such chambers being shown by way of example. The receptacle chambers are horizontally spaced in line on either side of a central chamber into which a thermometer 100 projects so that the temperature within the receptacle chambers may be gauged and read during the adjusting or testing of the thermostat device. Each of the receptacle chambers 98 is also provided with a closure or door 102 through which the thermostat device may be inserted or removed. Also mounted above each of the receptacle chambers 98, are a pair of indicator lamps 104 and 106 which may be respectively colored red and blue for example. A master indicator lamp 108 is also mounted adjacent to the thermometer 100 in order to indicate when the heater elements 90 and 90' are energized. Finally, the housing assembly 96 mounts below each of the receptacle chambers 98, a selector switch 110 through which any one of the thermostat devices within the receptacle chambers may be connected to a source of electrical energy during the adjusting or testing producer to be described hereafter.

Referring now to FIGURE 3, it will be observed that the apparatus is connected to a source of electrical energy through a powerline 112 and a return line 114. Upon closing of the switch 64, the powerline 112 is connected to an adjustable thermostat device 116 adapted to be housed within the central receptacle chamber so that it may be adjusted upon opening of the door 118 associated therewith as shown in FIGURE 1. The thermostat device 116 is normally in an electrically closed condition so that upon closing of the switch 64, electrical current will be conducted through the electrical heating elements 90 and 90' for energization thereof. When the heating elements reach a predetermined temperature, to which the thermostat device 116 is set, the circuit is opened so as to deenergize the heating elements at this temperature. Accordingly, the body of water may be elevated and maintained at a predetermined elevated temperature upon closing of the switch 64 during an automatic mode of operation. Selective opening of the switch 64 permits adjustment of the thermostat devices in accordance with a manual mode of operation wherein the thermostat device 116 is set to an extreme condition maintaining the heating elements 90 and 90' energized by observing the temperature of the body of water. When the temperature of the body of water reaches a desired value as indicated by the heat probe temperature reading device 74, the switch 64 is therefore manually opened in order to interrupt energization of the heating elements until the temperature of the body of water drops by a certain amount. Whenever the heating elements are energized regardless of the operational mode being utilized, the master indicator lamp 108 is illuminated. Accordingly, the lamp 108 is connected by conductor 120 to the power input terminal 122 of the heating elements to which the thermostat 116 is connected while conductor 124 connects the lamp 108 to the return line 114.

Also connected to the return line 114, by the conductor 126, are all of the pairs of indicator lamps 104 and 106, each pair of indicator lamps being respectively connected to the output terminals 16 and 18 associated with the thermostat devices 10 as hereinbefore described. Thus, when a thermostat device 10 is inserted into an insulated chamber 98 and supported in position against the wall of the tank 52 by the mounting saddle 128 as shown in FIGURE 2, its terminals 16 and 18 are electrically connected to the power terminals associated with the indicator lamps 104 and 106 as shown in FIGURE 3. The input terminal 112 of the thermostat device on the other hand is connected to the contact associated with one of the selector switches 110. Each of the selector switches 110 is therefore connected in parallel to the conductor 130 so that upon closing of the indicator switch 66, current may be supplied from the powerline 112 to any of the thermostat devices upon closing of its associated selector switch 110. For testing purposes, the powerline 112 is directly connected to the input terminal 12 of the thermostat device through test switch 68 and the test lead 70 then connected to the input terminal 12. During the same thermostat testing mode of operation, another lead 132 as shown by dotted line in FIGURE 3 is connected between the output terminal 16 of the thermostat device and the power input terminal 122 of the heating elements.

In order to adjust or balance any one of the thermostat devices removably received within the insulated receptacle chambers 98, the thermostat device is wired within the electrical circuit to the indicator lamps 104 and 106 and to its associated selector switch 110 as hereinbefore described in connection with FIGURE 3. The temperature of the water within the tank is then elevated by closing of the switch 64 energizing the electrical heating elements 90 and 90' as signified by illumination of the lamp 108. By way of example, when the body of water reaches approximately 100 degrees F. the adjustment screw 28 on the thermostat device is rotated in a clockwise direction by means of a screwdriver until a change of 16 degrees F. or 17 degrees F. is reflected by the pointer 22 on the dial face 24. Up to this point, the thermostat device will complete an energizing circuit through the indicator lamp 104 so that upon closing of the switch 66 and one of the selector switches 110, the red indicator lamp 104 associated with the thermostat device being adjusted will be illuminated. The indicator pointer 22 of the thermostat device is then slowly moved counterclockwise until the lamp 104 is extinguished and the blue lamp 106 is illuminated, as current is transferred from the contact associated with the terminal 16 to the contact associated with the terminal 18. The pointer adjustment is then reversed until the lamp 104 is illuminated. This procedure is repeated as the water temperature rises above 100 degrees F. until lamp 106 is illuminated when the heat probe 76 indicates the water temperature is 150 degrees F. while the thermostat device is at 130 degrees F. as indicated by thermometer 100. The differential between the temperature of the body of water and the temperature at the wall of the container 52 to which the thermostat responds in this case being 20 degrees F. A plurality of thermostat devices may thereby be sequentially adjusted in each of the receptacle chambers 98 upon closing of the associated selector switch 110, each thermostat device being removed from its receptacle chamber after it has been balanced. The temperature of the water may be lowered in order to adjust or readjust each of the thermostat devices by withdrawal of heated water through the outlet conduit 82 upon opening of the outlet valve 84, cold water being continuously supplied through the inlet conduit 78.

In order to test a thermostat device once it has been balanced, the switch 64 and thermostat device 116 are opened. The test lead 70 is then connected to the input terminal 12 of the thermostat device while the conductor 132 is interconnected between the output terminal 16 and the input terminal 122 to the heating elements. The indicator lamps 104 and 106 are also connected to the terminals 16 and 18 as indicated in FIGURE 3. The test switch 68 is then closed. If the blue indicator lamp 106 is illuminated upon closing of the test switch 68, this will indicate that the thermostat device is balanced since the temperature of the water will then be at the desired value of 150 degrees F. for example. On the other hand, if the master lamp 108 is illuminated, this will indicate that the dial pointer 22 must be moved counterclockwise by a fraction more since the current is being conducted through the terminal 16 and conductor 132 to the lamp 108. If both the master lamp 108 and indicator lamp 106 are illuminated, this will indicate a short between the contacts associated with the terminals 16 and 18 which may be corrected by clockwise rotation of the adjustment screw 32 of the thermostat device. Before testing a balanced thermostat device in accordance with the foregoing procedure, it must be cooled to a temperature substantially below the temperature of the tank so that when installed on the apparatus, the red indicator lamp 104 will initially be illuminated. If the thermostat device has been properly balanced, the red indicator lamp 104 will be extinguished and the blue indicator lamp 106 illuminated when the temperature of the thermostat device reaches the temperature of the tank 52 on which it is mounted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for adjusting thermostat devices comprising, a container, electrical heating means mounted within the container, insulated housing means mounted on the container for removably receiving a plurality of said thermostat devices, a temperature indicating probe mounted within the container in spaced relation to the thermostat devices, selectively controlled means connected to the heating means for intermittent energization thereof to maintain a predetermined temperature within the container as indicated by the probe, indicator means operatively connected to each of said thermostat devices for signifying a change in condition thereof, and selector means for rendering said indicator means operative to signify a change in condition of a selected thermostat device at said predetermined temperature within the container in response to adjustment of the selected thermostat device.

2. The combination of claim 1 including means for indicating the temperature differential between the insulated housing means and the contents of the container at the temperature indicating probe.

3. The combination of claim 2 including means for indicating when the heating means is energized.

4. The combination of claim 3 including an inlet conduit connected to said container for supply of liquid thereto at a temperature substantially lower than said predetermined temperature, said conduit having spaced outlet ports internally of the container respectively located adjacent the thermostat devices and the heating means.

5. The combination of claim 4 including testing circuit means connectible to the thermostat devices and the heating means for rendering the indicator means operative to indicate any fault in a thermostat device that has been adjusted.

6. The combination of claim 1 including means for indicating when the heating means is energized.

7. The combination of claim 6 including testing circuit means connectible to the thermostat devices and the heating means for rendering the indicator means operative to indicate any fault in a thermostat device that has been adjusted.

8. The combination of claim 1 including an inlet conduit connected to said container for supply of liquid thereto at a temperature substantially lower than said predetermined temperature, said conduit having spaced outlet ports internally of the container respectively located adjacent the thermostat devices and the heating means.

9. Apparatus for adjusting and testing thermostat devices comprising, an elongated tank containing a body of water, electrical heating means mounted within the tank for elevating the temperature of the water therewithin, heat probe means extending into the tank for indicating the temperature of the water internally of the tank, insulated housing means mounted externally on the tank for removably receiving one of said thermostat devices in heat conductive relation to the tank, a pair of indicator lamps connected to the thermostat device within the housing means for indicating the condition of said thermostat device, a source of electrical energy, selector switch means connecting said source to the thermostat device for energizing one of said pair of lamps, thermostat means operatively connecting said source to the heating means, thermometer means for measuring the temperature within said housing means and indicator means connected to the heating means for indicating when the heating means is energized by said source.

10. Apparatus for adjusting and testing a thermostat device comprising, a heat conductive tank containing a body of water, means for heating and cooling said water to a desired temperature, means for measuring the temperature differential between the water and the tank, insulated receptacle means mounted on the tank for receiving the thermostat device, and indicator means connected to the thermostat device within the receptacle means for indicating the condition of the thermostat device.

References Cited

UNITED STATES PATENTS

| | | | |
|---|---|---|---|
| 2,535,083 | 12/1950 | Martin | 73—1 |
| 2,658,380 | 11/1953 | Evans | 73—1 |

LOUIS R. PRINCE, *Primary Examiner.*

S. CLEMENT SWISHER, *Assistant Examiner.*